Feb. 27, 1923.
H. M. HOWELL.
OPERATING DEVICE FOR TIRE VALVES.
FILED OCT. 4, 1921.
1,446,504.
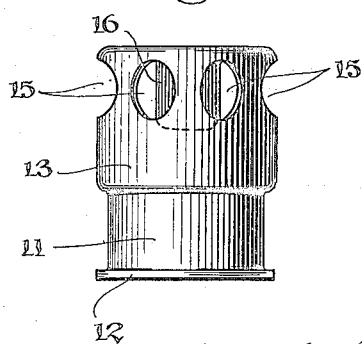
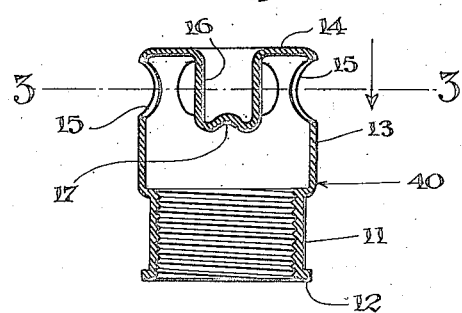
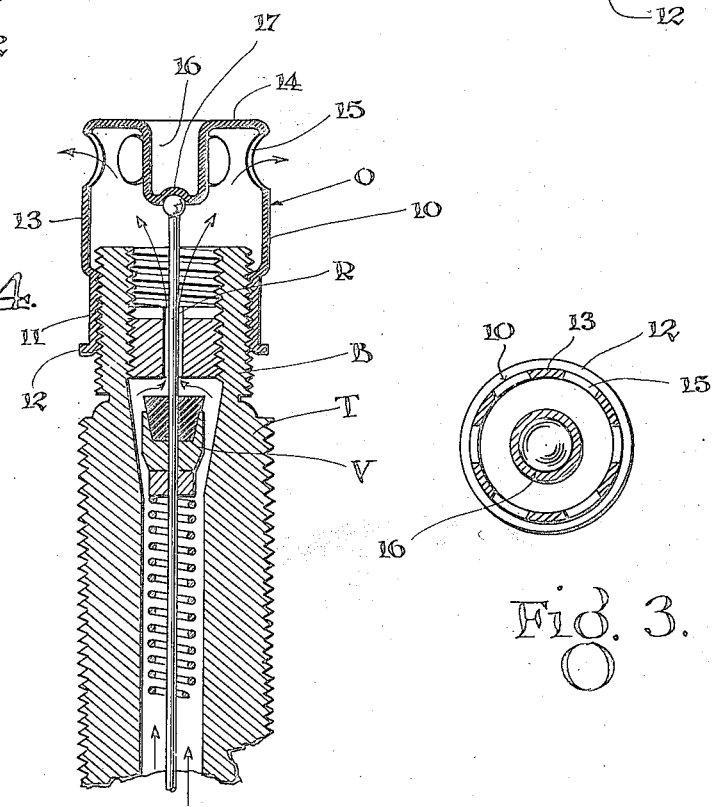
WITNESSES
INVENTOR
HENRY M. HOWELL.
BY
ATTORNEYS Patented Feb. 27, 1923.

1,446,504

UNITED STATES PATENT OFFICE.

HENRY M. HOWELL, OF MONROE, LOUISIANA.

OPERATING DEVICE FOR TIRE VALVES.

Application filed October 4, 1921. Serial No. 505,309.

*To all whom it may concern:*

Be it known that I, HENRY M. HOWELL, a citizen of the United States, and a resident of Monroe, in the parish of Ouachita and State of Louisiana, have invented certain new and useful Improvements in Operating Devices for Tire Valves, of which the following is a specification.

The present invention relates to an operating device for tire valves.

In the tire valves employed in conjunction with the inner tubes of pneumatic tires used on automobiles and other vehicles there is provided a valve stem which carries the valve proper and which is actuated by a spring to normally seat the valve. When the tire is being pumped up, the valve is unseated by the pressure of the air being pumped into the tire which moves the valve and its stem against the action of its spring. But, when it is desired to deflate the tire, the valve stem must be depressed against the action of the spring, so as to move the valve away from its seat and permit the air to escape, or else the valve assembly must be entirely removed from the barrel in which it is contained. The removal of the valve assembly is objectionable for while it results in rapid and complete deflation, it destroys the effectiveness of the valve assembly as these valve assemblies have been found to be unsatisfactory and inefficient and frequently inoperative when replaced in the barrel after having been removed. An expedient usually resorted to in practice has been to depress the valve stem with a match, the finger nail or other convenient means of like character but in this way only partial deflation is obtained unless the inner tube is squeezed or otherwise manipulated to express the air therefrom while the valve stem is held depressed. It is often desirable to deflate and roll an inner tube for convenient packing, and to do this it is necessary to manipulate the tube in order to express all of the air pressure and at the same time hold the valve stem of the tire valve depressed. This usually requires more than one person, since manipulation of the inner tube requires the use of both hands and the depressing of the valve stem requires at the same time the use of one hand at least. Moreover, even when partial deflation is obtained the continuous use of one hand is required in maintaining the valve depressed all during the time the air is escaping.

The object of the present invention is to provide an operating device for tire valves which may be conveniently and quickly associated with the barrel or body of the valve and which when so associated automatically engages, depresses and maintains depressed the stem of the valve proper thereby unseating the valve and permitting the air to escape, without requiring further attention on the part of the operator, thus facilitating the deflation of the tube and permitting its deflation and packing by one person.

Another object is to provide a device of this character which is of extremely simple and durable construction, reliable in operation and easy and inexpensive to manufacture.

Other objects and advantages of the invention reside in certain novel features of construction, combination and arrangement of parts which will be hereinafter more fully described and particularly pointed out in the appended claims, reference being had to the accompanying drawings forming part of this specification, and in which:

Figure 1 is a view in side elevation, illustrating the preferred embodiment of the invention;

Figure 2 is a view thereof in vertical section;

Figure 3 is a view in transverse section, on line 3—3 of Figure 2; and

Figure 4 is a view in vertical section, showing the device applied to a tire valve.

Referring to the drawings wherein for the sake of illustration is shown the preferred embodiment of the invention, the reference character T designates the tire valve which is carried by the inner tube of the conventional pneumatic tire. The tire valve includes an externally threaded portion or barrel B which normally receives the valve cap and also includes the operating stem or rod R and the spring pressed valve V. All of these parts are of conventional or widely known construction and form no part of the present invention.

The operating device for the valve which constitutes the present invention, is designated generally at O, and as shown in the drawings is constructed of a single piece of metal and comprises a cylindrical body portion 10 having an internally threaded section 11 provided at its lower end with an annular bead or lip 12 and contiguous at its upper end with a slightly enlarged section 13. The upper section 13 of the cylindrical body portion 10 is integrally formed with a head 14 and adjacent this head 14 the upper section 13 of the body portion is provided with a circular series of vents or air escape openings 15. The metal which constitutes the head 14 is pressed inwardly to provide a valve stem engaging boss or stud 16 having its lower end cupped, as at 17 to better receive and engage the end of the valve stem of the operating rod R.

When it is desired to deflate the inner tube of a pneumatic tire, the operating device O is grasped in the fingers of one hand and the valve cap having been removed it is threaded on the barrel B of the tire valve as shown in Figure 2. If desired, the periphery of the body portion of the operating device may be milled or serrated or otherwise roughened to facilitate the turning thereof. As the device O is turned on the barrel B it is advanced longitudinally thereof and the stud 16 of the device approaches and eventually engages the upper end of the operating stem or rod O of the tire valve. The device is further turned after this engagement of the stud and stem until the stem is depressed and the valve V is unseated to permit the air to escape out through the openings 15 of the operating device.

The device is preferably constructed of a single piece of metal and is thus susceptible of quantity production on any desired scale. It affords a ready and convenient means for effecting the deflation of the inner tubes of pneumatic tires and after it is positioned on the tire valve the deflation progresses automatically and without further attention on part of the operator and thus in the instances of an extra inner tube which is to be deflated and packed, the device makes it possible for a single operator to carry out this action.

The enlarged section 13 of the body portion adapts the operating device for use with valves having different length barrels, since it permits the body portion to be advanced for almost its entire length onto the barrel.

I claim:

As a new article of manufacture, a tire deflating device made of a single metal blank pressed to shape and comprising a body portion and a head portion, said body portion including a cylindrical lower section internally threaded for engagement with a valve barrel and an enlarged cylindrical upper section having a circular series of openings adjacent its upper end, said openings constituting air vents, said head portion closing the upper end of said upper section and having a hollow stud pressed therefrom projecting axially within the body portion, said stud having its inner end pressed to cup shape whereby to adapt the same to positively engage and propel the operating stem of the tire valve.

HENRY M. HOWELL.